No. 828,972. PATENTED AUG. 21, 1906.
M. L. SANBORN.
INSECT DESTROYER.
APPLICATION FILED SEPT. 16, 1905.
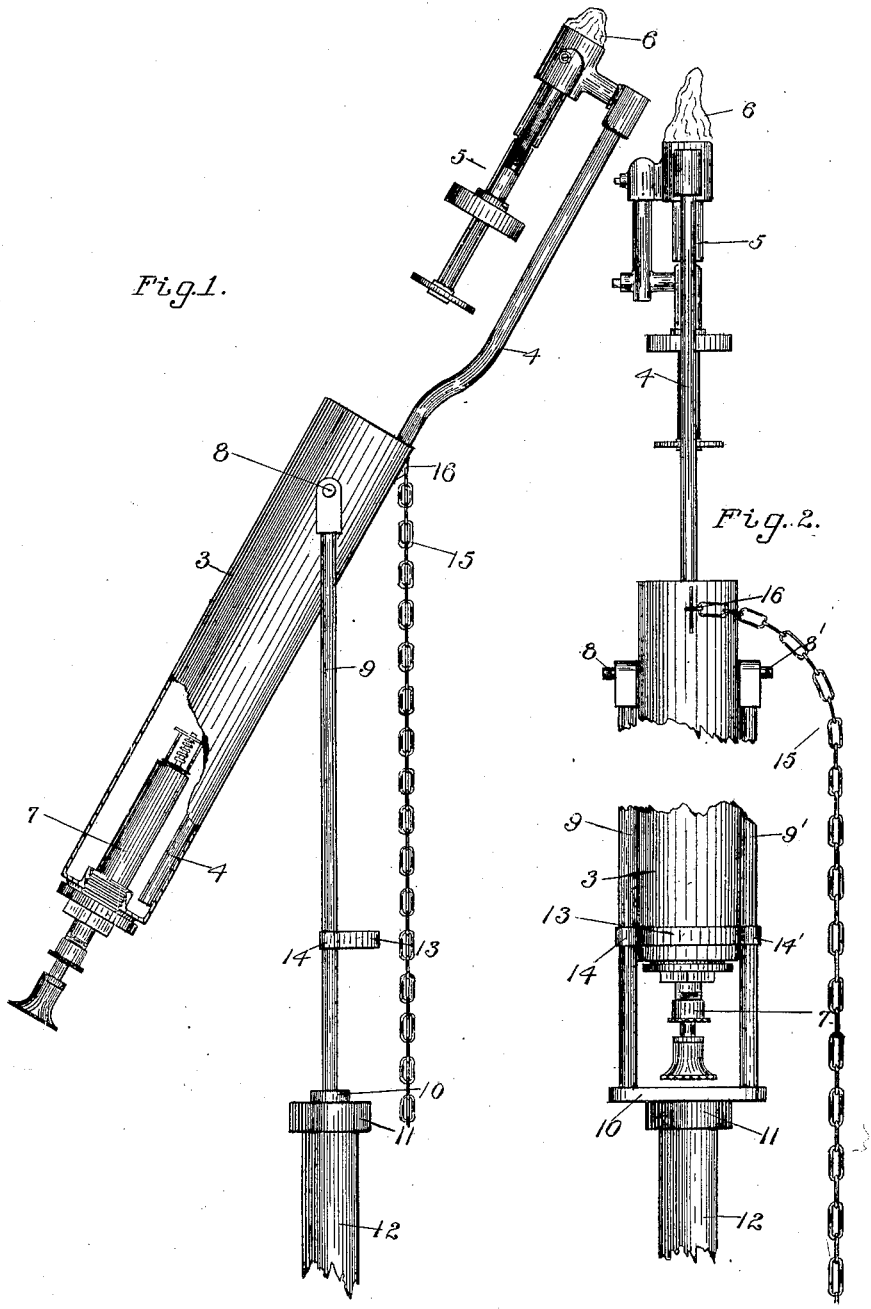
Witnesses.
Sadie J. Powers.
Raphael G. Blanc.
Inventor.
Moses L. Sanborn.
by Charles F. A. Smith
Attorney.

UNITED STATES PATENT OFFICE.

MOSES L. SANBORN, OF BOSTON, MASSACHUSETTS.

INSECT-DESTROYER.

No. 828,972.        Specification of Letters Patent.        Patented Aug. 21, 1906.

Application filed September 16, 1905. Serial No. 278,757.

*To all whom it may concern:*

Be it known that I, MOSES L. SANBORN, a citizen of the United States, residing at Boston, in the county of Suffolk and State of Massachusetts, have invented certain new and useful Improvements in Insect-Destroyers, of which the following is a specification, reference being had therein to the accompanying drawings.

My invention relates to certain improvements in devices for destroying insects and their nests and eggs on plants of all kinds, especially the destroying of gipsy-moths, their eggs, and nests on tall trees and posts.

The invention comprises a burner attached to a reservoir and having a flame for instantly burning the nests, the insects, and their eggs and the whole so arranged that the small blue flame can be moved along in and out among the branches and leaves of trees of all heights and operated by a party standing upon the ground and the upper portion of the device tilted without movement of the handle or long pole upon which the burner and its reservoir have been placed, so that the flame can be sent straight into the crotch of a tree or at an angle downward into indentations that would otherwise be impossible to reach unless the man desiring to destroy the insects climbed the tree at a great waste of time and strength. It is thus seen that by the using of my device the operator will in no case be obliged to climb into the tree and endanger his life and limb, also that he can work much faster, as it will not be necessary to carry long ladders, as is now the case.

The invention consists in the combination of elements and in certain parts of novel construction entailed in the combination of said elements to obtain the desired result.

A full understanding of my invention can best be given by a detailed description of a preferred construction embodying the various features of my invention, and such a description will now be given in connection with the accompanying drawings, and I obtain my object by the mechanism there illustrated, showing such preferred construction, and the features forming the invention will then be specifically pointed out in the claims.

In the accompanying drawings, Figure 1 is a side elevation of my device with part of the casing of the reservoir broken away, showing the pump. Fig. 2 is a rear elevation of the same.

Latitude is allowed herein as to details, as they may be changed or varied at will without departing from the spirit of my invention and the same yet remain intact and be protected.

Corresponding and like parts are referred to in the following description and indicated in both of the views of the drawings by the same reference characters.

In the drawings the numeral 3 represents the reservoir connected by a supply-pipe 4 with a burner 5 of any suitable size, from which is thrown a blue flame 6 for destroying the insects and their nests. The pipe 4 extends downward within the reservoir 3 to any suitable distance, which reservoir is adapted to carry and supply gasolene or other inflammable substance to the burner and may be provided with a force-pump 7 in its lower portion.

Attached to the side of the reservoir near its upper part are the studs 8 8', which are pivoted in the upper part of the downward-extending arms 9 9', having a connecting cross-bar 10 at their lower portion, to which is attached or made integral with it the cap 11, in which is inserted the long handle or pole 12, by which the device may be raised among the branches of the trees to any height according to the length of the handle or lifting-pole.

Attached to the arms 9 9', as at 14 14', and extending partly around the lower portion of the reservoir is the semicircular buffer-band 13, of metal, leather, or other suitable material, adapted to prevent the reservoir 3 from swinging in more than one direction on the arms 9 9' and to allow the reservoir, the burner, and its flame to nominally remain in a vertical position when the handle is held in a similar position. Attached to the upper rear portion of the reservoir by a staple 16 or any other suitable means is a chain or rope, of hemp or other material, 15, by which the reservoir and burner may be tilted to any desirable position while the handle is held in a vertical or other position. If desired, a second pole or rod may be substituted for the chain 15.

It is understood that my invention is not limited to the specific details of construction shown in the accompanying drawings, but that said details may be varied in the practical carrying out of my invention. It is also to be understood that the combinations specifically set forth in the several claims are intended to be separately claimed without limitation to the use in connection therewith of other features and details of construction illustrated.

Having thus described my invention, I claim as new and desire to secure by Letters Patent—

1. A device for destroying insects on plants comprising a reservoir, a burner connected to the reservoir, means for supporting the reservoir, and means for tilting the reservoir and burner to any angle, substantially as shown.

2. A device for destroying insects on plants, comprising a reservoir provided with a pump, a burner connected to the reservoir, a lifting-pole attached to the reservoir for raising it, and means for tilting the reservoir without tilting the handle, substantially as shown.

3. A device for destroying insects on plants, comprising a reservoir, a burner, a supply-pipe extending from within the reservoir and connected to the burner, a forked handle, studs extending from the reservoir and pivotally mounted on the handle, a chain attached to the upper part of the reservoir for tilting the reservoir on its handle and means for preventing the tilting of the reservoir in more than one direction, substantially as shown.

In testimony whereof I affix my signature in presence of two witnesses.

MOSES L. SANBORN.

Witnesses:
CHARLES F. A. SMITH,
SADIE E. POWERS.